United States Patent [19]

Abrams

[11] Patent Number: 4,548,221
[45] Date of Patent: Oct. 22, 1985

[54] FOOD PRODUCTS WASHING AND DRYING MACHINE

[75] Inventor: Stanton Abrams, Los Angeles, Calif.

[73] Assignee: Shelley Manufacturing Company, Division of Alco Food Service Equipment Company

[21] Appl. No.: 575,053

[22] Filed: Jan. 30, 1984

[51] Int. Cl.⁴ ............................................. B08B 3/06
[52] U.S. Cl. .................... 134/141; 134/153; 134/155; 99/536; 210/360.1
[58] Field of Search ............. 134/153, 155, 137, 138, 134/119, 121, 141, 198, 148, 163, 158; 99/516, 99/536; 68/23 R, 23.5, 148; 210/360.1

[56] References Cited

U.S. PATENT DOCUMENTS

| | | | |
|---|---|---|---|
| 1,264,792 | 4/1918 | Hayward | 134/153 X |
| 1,634,238 | 6/1927 | Sinclair | 68/23 |
| 1,703,946 | 3/1929 | Melish | 134/141 |
| 1,952,574 | 3/1934 | Adams | 68/23 UX |
| 2,333,707 | 11/1943 | Curtis | 134/138 |
| 2,562,076 | 7/1951 | Weisselberg | 134/158 X |
| 2,968,938 | 1/1961 | Frohnapel et al. | 134/141 X |
| 4,236,541 | 12/1980 | Cipriani | 99/516 X |
| 4,368,747 | 1/1983 | Taylor | 134/141 X |

FOREIGN PATENT DOCUMENTS

| | | | |
|---|---|---|---|
| 821438 | 12/1937 | France | 134/153 |
| 1133365 | 3/1957 | France | 134/138 |
| 103338 | 2/1923 | Switzerland | 134/141 |

Primary Examiner—Philip R. Coe
Assistant Examiner—Frankie L. Stinson
Attorney, Agent, or Firm—Ernest H. Schmidt

[57] ABSTRACT

A greens or vegetable washing and drying machine has a spinner basket removeably receivable on a spinner table comprising part of a housing assembly including means for spraying pressured household supply water into the basket for washing. The pressurized water is also utilized to run a water turbine for rotating the spinner table and the spinner basket received thereon after the greens, vegetables or other food products have been thus washed.

5 Claims, 6 Drawing Figures

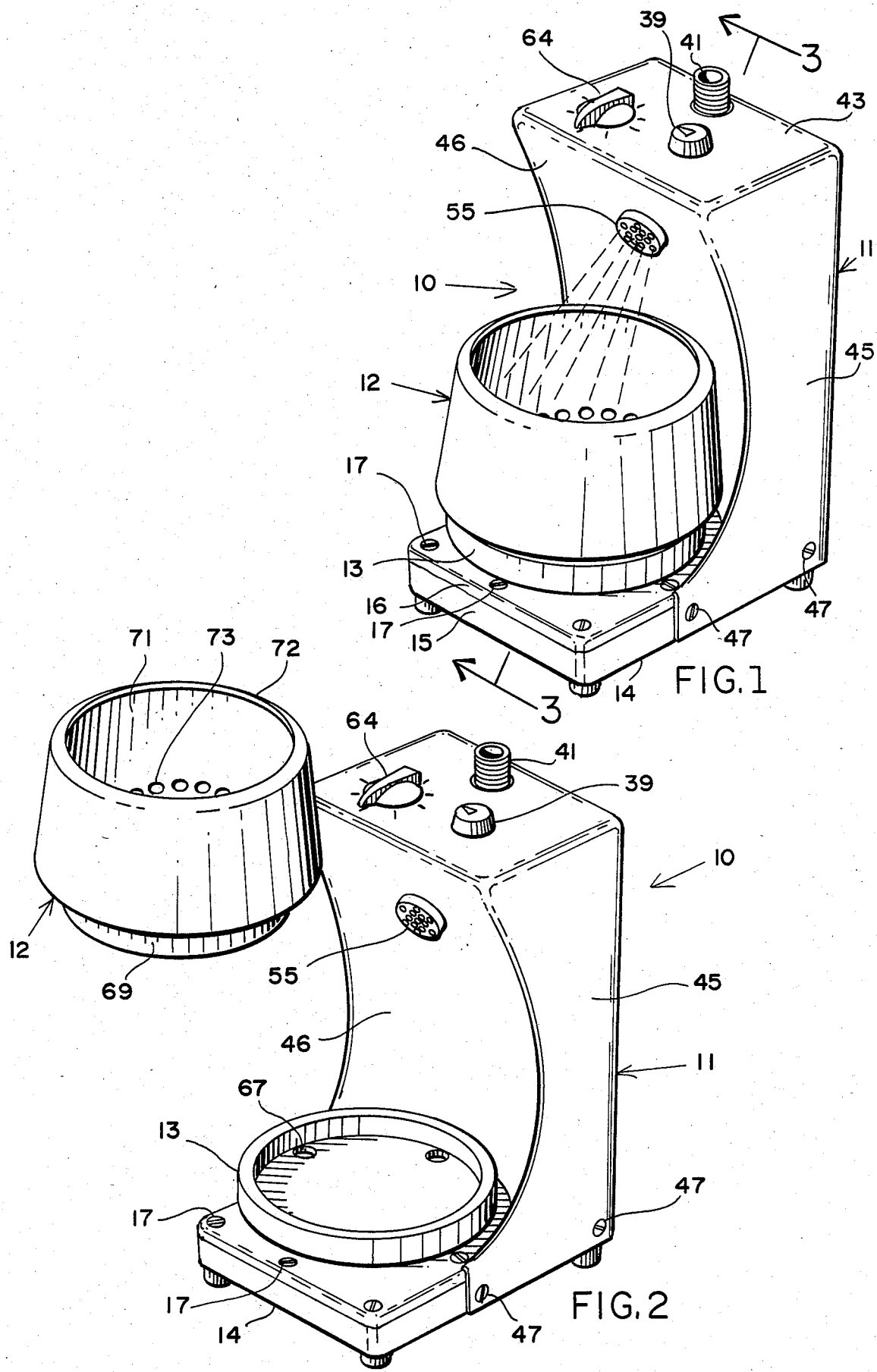

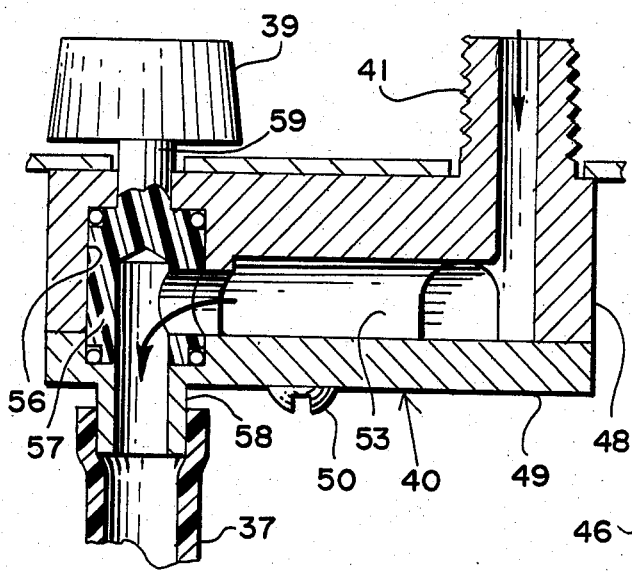
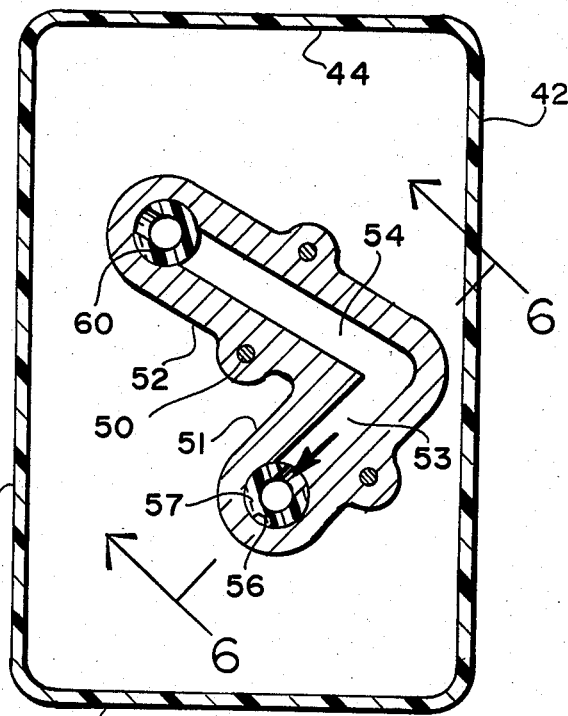
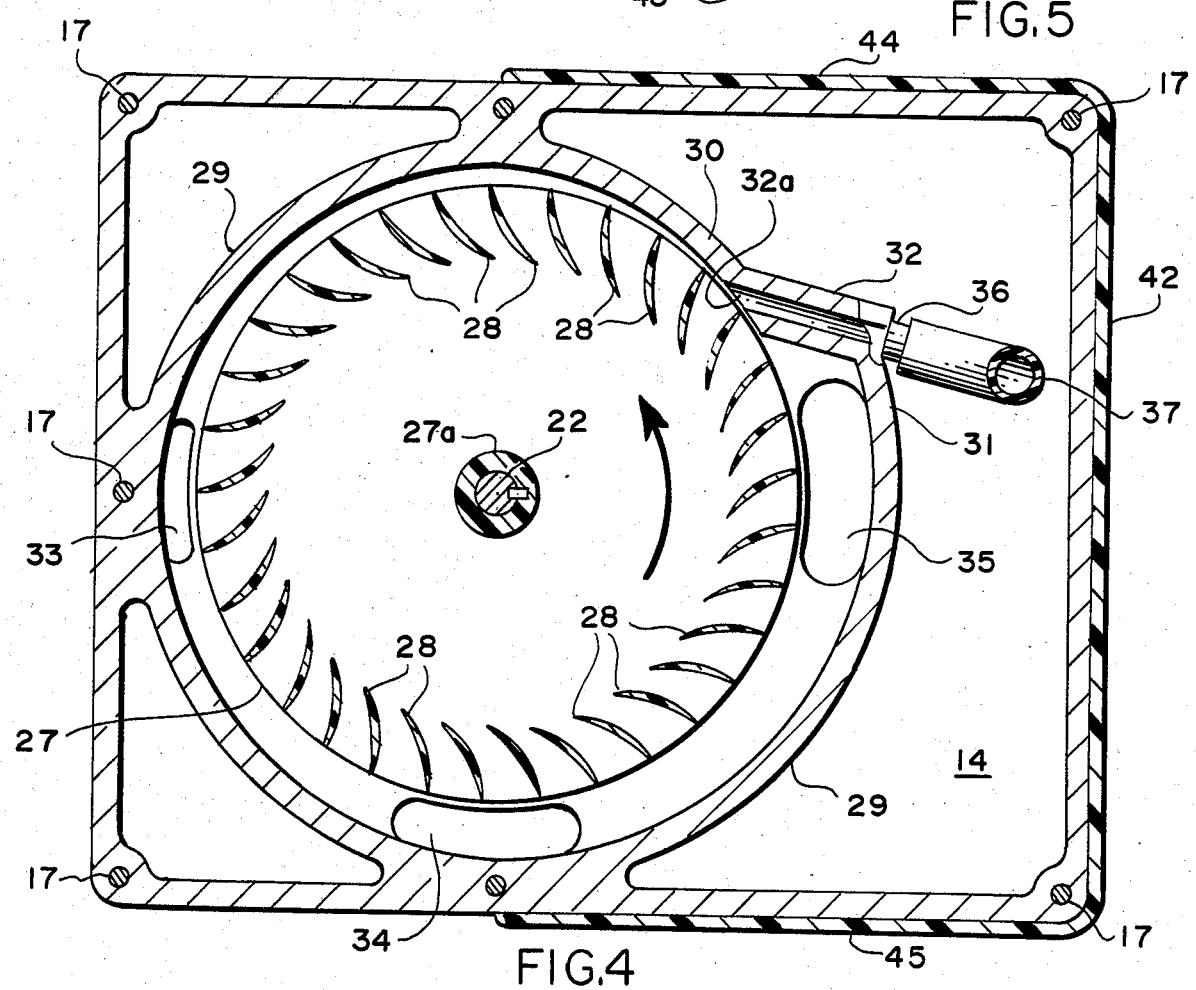
FIG. 6
FIG. 5
FIG. 4

FOOD PRODUCTS WASHING AND DRYING MACHINE

This invention relates primarily to salad and leafy vegetable preparation devices and is directed particularly to a novel and improved food products washing and drying machine for use in the home, small restaurants and the like where comparatively small amounts of food products are to be prepared for prompt serving.

There is presently available a wide variety of salad and greens or vegetable washing and drying machines with centrifical water extractors, ranging from hand-held, manually-operated spinner baskets for use in the home to free-standing electric motor operated spinner drums for use in medium size and large restaurants. This invention is directed to an intermediate size vegetable washing and drying machine having novel and improved features that make it particularly well suited for small volume production. It is therefore particularly advantageous for use in the preparation of vegetables and salads in large family homes, and low-volume restaurants and lunch counter establishments.

It is, accordingly, the principal object of this invention to provide a novel and improved vegetable washing and drying machine of the character described that is of such small size and weight, and so compact, as to be receivable for use when placed within or attached under an ordinary household or restaurant sink, so as to drain directly into the sink or water line and which can readily be disconnected and stored in a kitchen cabinet or the like when not in use.

Another object of this invention is to provide a vegetable washing and drying machine of the above nature wherein the spinner basket can be removed simply by lifting from its spinner table or platform for remote use for the preparation of salads and the like at the table.

Another object of the invention is to provide a vegetable washing and drying machine in which the washing is accomplished by water showering prior to spin drying.

Still another object of the invention is to provide a vegetable washing and drying machine in which the motive power for spin-drying the salad greens or the like in the spinner basket is either electrical or in the form of an electric motor or is derived from a water turbine actuated by the same pressurized tap water used in spray-washing.

Other objects are to provide a vegetable washing and drying machine of the above nature which will be simple in construction, efficient in operation and dependable and durable in use.

Still other objects, features and advantages of the invention will be apparent from the following description when read with reference to the accompanying drawings.

BRIEF DESCRIPTION OF THE DRAWINGS

FIG. 1 is an oblique view, as seen from the front, of a vegetable washing and drying machine embodying the invention;

FIG. 2 is a view similar to that of FIG. 1, but showing the vegetable or greens basket removed;

FIG. 4 is a transverse cross-sectional view taken along the plane indicated at 4—4 of FIG. 3 in the direction of the arrows;

FIG. 5 is a horizontal cross-sectional view taken along the plane indicated at 5—5 of FIG. 3 in the direction of the arrows; and FIG. 6 is a vertical cross-sectional view taken along the plane indicated at 6—6 of FIG. 5 in the direction of the arrows.

DESCRIPTION OF THE PREFERRED EMBODIMENT

Figure 3:
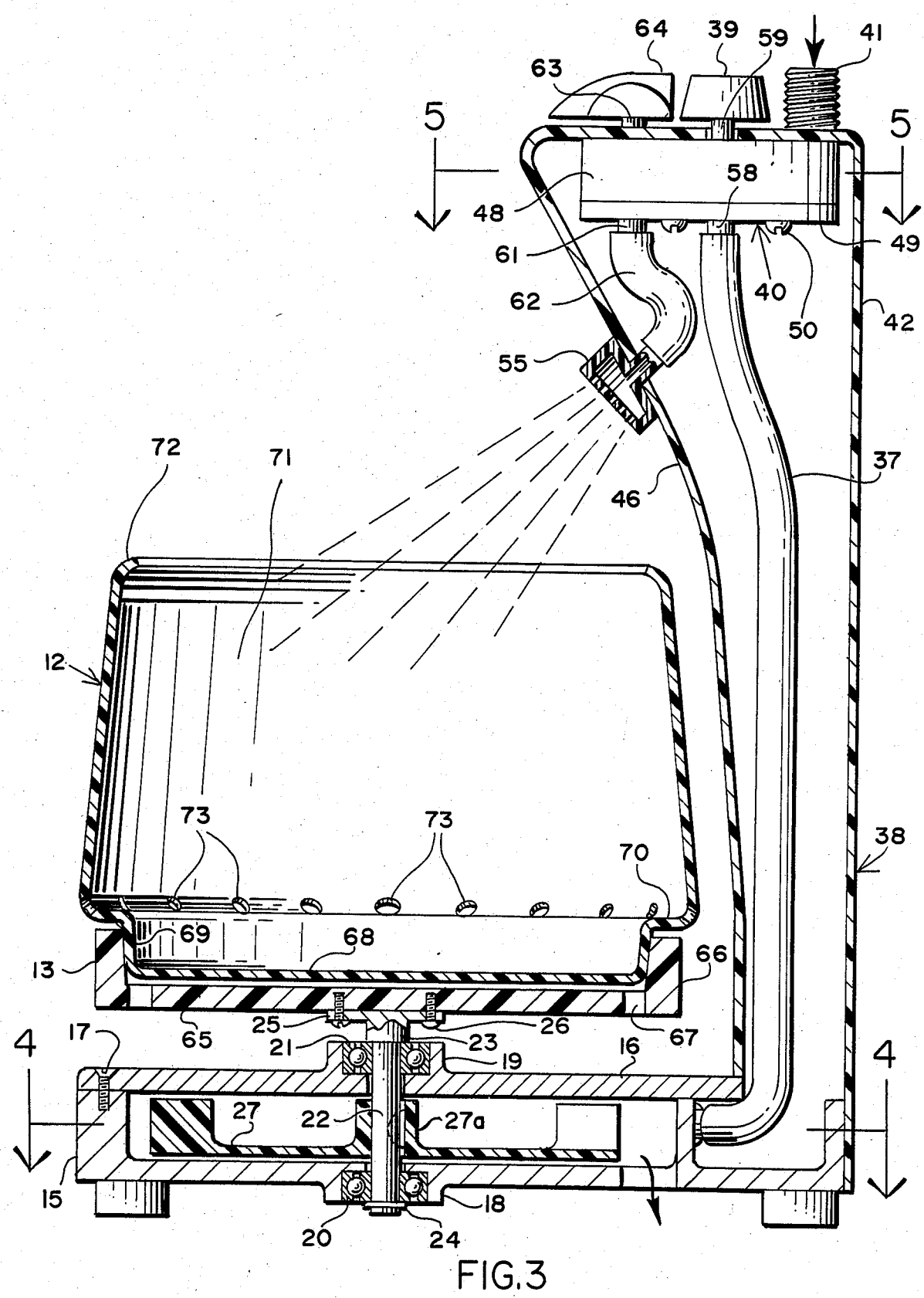
FIG. 3 is a vertical cross-sectional view taken along the plane indicated at 3—3 of FIG. 1, illustrating mechanical details.

Referring now in detail to the drawings, reference numeral 10 in FIGS. 1 and 2 indicates, generally, a preferred form of water turbine driven vegetable washing and drying machine employing the invention. The machine comprises a wash and spin assembly 11 and one or more vegetable or greens baskets 12, (only one illustrated in FIGS. 1 and 2), removably receivable upon spinner table 13.

As best illustrated in FIGS. 2, 3 and 5, the wash and spin assembly 11 comprises a substantially rectangular base plate 14 having a peripheral, upstanding enclosure wall 15. A cover plate 16 is secured against the upper end of the enclosure wall 15 as by screws 17, (only front center screw illustrated in FIG. 3). The base plate 14 and cover plate 16 are formed with central, vertically aligned, circular-outwardly-directed projections or bosses 18, 19, respectively, providing recesses for the press-fit reception of ball-bearing assemblies 20, 21, journaling a vertically-extending rotary shaft 22. The upper end of the rotary shaft 22 is formed with an increased-diameter portion 23 defining an underneath annular shoulder which seats against the upper end of ball-bearing assembly 21. The lower end of the rotary shaft 22 extends slightly beyond the underside of lower ball-bearing assembly 20, where it is constrained against any substantial upward movement by a C-ring or retainer clip 24. The increased-diameter portion 23 of rotary shaft 22 terminates at its upper end in an integrally-formed, co-axial, circular disk or plate 25 of substantially increased diameter, against which the circular spinner table 13 seats in concentric relation and is secured in place as by screws 26. A circular bucket wheel 27, which has a central hub 27a, is keyed to the rotary shaft 22 within the interior space defined by the base plate 14 and cover plate 16. As best illustrated in FIG. 4, the bucket wheel 27 is formed with a plurality of arcuate bucket members or vanes 28 extending upwardly with respect to a marginal, outer peripheral portion of said bucket wheel.

As further illustrated in FIG. 4, the base plate 14 is integrally formed with an arcuate, upstanding wall portion 29 of spiral shape surrounding the bucket wheel 27, increasing gradually in its radial distance from the center of rotation of said bucket wheel from one end thereof, indicated at 30, to the other end thereof, indicated at 31. Molded between the two ends 30 and 31 of the upstanding wall portion 29 is an angular tube portion 32 positioned to direct a stream of water under pressure against the bucket members or vanes 28 of the circular bucket wheel 27 as they pass by the jet opening 32a at the outer end of said angular tube portion 32. The jet stream of water thus applied to impel rotation of the circular bucket wheel 27 in the manner of a turbine machine is subsequently discharged through elongated openings 33, 34, 35, disposed in spaced relation in the base plate 14, adjacent to the outer periphery of said bucket wheel and within the space therebetween defined by the spiral-shaped, upstanding wall portion 29.

Means is provided for supplying water under pressure to the angular tube portion 32. To this end, said tube portion terminates at the outside in a reduced-diameter nipple portion 36 connected to one end of a flexible hose 37. The hose 37 extends upwardly through a rear housing 38, (see FIG. 3), where it communicates through a pressure control valve 39, a conduit 40, and threaded nipple 41 to attachment to a hose fitting supplying water pressure to the vegetable washing and drying machine, as is hereinafter more particularly described.

The rear housing 38 is preferably integrally molded of a synthetic plastic material, and comprises an upstanding, rectangular backwall portion 42, a flat, rectangular topwall portion 43, opposed sidewall portions 44, 45, and frontwall portion 46. As best illustrated in FIGS. 1, 2 and 3, frontwall portion 46 is of arcuate configuration, recessing inwardly from top to bottom to shroud the vegetable or greens basket 12 in spaced relation when said basket is fitted in place as illustrated in FIG. 1. The rear housing 38 is secured in place with respect to the upstanding enclosure wall 15 as by a plurality of screws 47, (only two screws illustrated in FIGS. 1 and 2).

As illustrated in FIGS. 5 and 6, the conduit 40 comprises a two-part molded housing 48, 49, secured together as by screws 50, said housing further being secured against the underside of the topwall portion 43 of the rear housing 38. As illustrated in FIG. 5, the molded housing of the conduit 40 comprises two relatively angularly-disposed branches 51, 52, branch 51 of which constitutes an internal, through passageway 53 for directing the flow of water under pressure to the hose 37 for operating the bucket wheel 27 and branch 52 of which constitutes an internal passageway 54 for directing the flow of water under pressure to a showerhead 55, as is hereinafter more particularly described. The upper part 48 of the two-part molded housing is integrally formed, at the juncture of the internal passageways, 53, 54, with the threaded nipple 41, said nipple extending upwardly through an opening in the topwall portion 43 of rear housing 38. The outer end of the internal passageway 53 opens into a cylindrical recess 56 rotatably received within which is a valve head 57 having a right-angular, through opening controlling the flow of water under pressure to the downwardly-projecting nipple 58 to which the flexible hose 37 is connected. The valve head 57 is integrally formed with an upwardly-extending valve stem 59 projecting through an opening in the topwall portion 43 of rear housing 38, the outer end of which valve stem is fitted with a manual control knob 39 for the adjustment of water pressure applied through the jet opening 32a associated with the circular bucket wheel 27.

The outer end of the internal passageway 54 of the two-part molded housing 48, 49 opens into an identical valve mechanism for controlling water supplied under pressure to integrally formed nipple 61, (see FIG. 3), said nipple connecting with a short length of flexible hose 62 supplying said water under pressure to the shower head 55. The shower head 55 is secured against the outside of the front wall portion 46 of the rear housing 38, and is so located as to direct a spray of water into the basket 12 when fitted in place on the spinner table 13. As illustrated in FIGS. 1 and 3, the valve stem 63 of the valve controlling water under pressure to the shower head 55 extends upwardly through an opening in the topwall portion 43 of the rear housing 38, whereat it is fitted with a manual control knob 64 for adjusting flow rate through the shower head 55.

The spinner table 13 comprises a flat, circular bottom plate portion 65 integrally formed with an upstanding rim 66 providing a shallow, circular recess for interfitting reception of the vegetable or greens basket 12. A plurality of circularly-equidistantly-spaced openings 67 are provided in the bottom plate portion 65 adjacent rim portion 66, for the drainage of wash water. The vegetable or greens basket 12 is integrally formed, preferably of a tough synthetic plastic material, and comprises a circular bottom portion 68, an upstanding peripheral wall portion 69, an outwardly-extending peripheral wall portion 70, and a comparatively long, upwardly-extending sidewall portion 71. The sidewall portion 71 inclines inwardly, from bottom to top, and terminates in a short, rounded, inwardly-directed lip portion 72. The rounded juncture between the outwardly-extending portion 70 and the upwardly-extending sidewall portion 71 is provided, about its periphery, with a plurality of equidistantly spaced, through openings 73 for the discharge of water under centrifical force as the basket spins during operation, as is hereinafter described.

In operation, after the spinner basket 12 has been filled with the vegetables or greens to be washed and dried, it will be placed upon the spinner table 13. Water supplied to the threaded connector nipple 41 through a length of flexible hose connected at the other end to source of pressurized water, such as a sink faucet or hose bib, will then be directed through the shower head 55 by manual adjustment of the control knob 64. At the same time, knob 39 controlling water under pressure supplied to the water turbine will be adjusted to slowly rotate the spinner basket during the washing operation. Upon completion of washing, the shower control knob 64 will be turned off and the control valve for supplying motive power to the rotor will be turned on so as to spin the basket at a velocity sufficient to centrifugally expel the water through the basket openings 73. Drain water from the shower wash and spin-dry operations will discharge by gravitation through the waste drain of the sink in which the device is placed when in use.

Although I have particularly described my invention as a device for washing and drying vegetables and salad greens, it is also well suited to the washing and/or the drying or extracting of excess moisture from fruits or grains such as rice, as well as other suitable materials or products. To this end, the through openings 73 in the spinner basket used would be of a size suited to the material or product to be washed and/or dried.

Alternatively, the product to be treated could be placed in a mesh bag or the like serving as an inner container placed within the spinner basket. A measured portion of the product could thus easily be spin dried and removed as a unit, with the mesh bag used as a storage container.

It is to be understood also that instead of washing the product in the spinner basket first, it could alternatively be washed with the use of the shower head 55 at the same time that the spinner basket is being rotated for extraction of the wash water and moisture contained in the product.

While there is illustrated and described herein only one form in which my invention can conveniently be embodied in practice, it is to be understood that this embodiment is presented by way of example only, and not in a limiting sense. For example, instead of utilizing a water turbine for rotating the spinner basket as is hereinabove described, a small, hermetically-sealed electric motor could be used instead for rotating the spinner table 13. Such an electric motor could be mounted in the housing above the spinner basket as a self-contained unit, or remotely mounted to rotate the spinner basket or container by means of a drive shaft extending through the bottom of the sink compartment.

What I claim as new and desire to secure by Letters of Patent is:

1. A food products washing and drying machine comprising, in combination, a flat, circular spinner table, means for rotating said spinner table about a vertical axis, a spinner basket, said spinner basket being symmetrical about its vertical axis of generation, said spinner table having an upstanding rim providing a shallow circular recess at the top thereof, said spinner basket comprising a circular bottom wall integrally formed with an upstanding peripheral wall portion receivable in interfitting relation within said spinner table recess to provide for rotation of said spinner table and said spinner basket in unison, said spinner basket further comprising a radially outwardly-extending peripheral wall portion merging with said rim portion and a comparatively long, upwardly-extending sidewall portion merging with said outwardly-extending peripheral wall portion, said sidewall portion being inclined radially inwardly from bottom to top, the juncture of said outwardly-extending portion and said upwardly-extending sidewall portion being provided, about its periphery, with a plurality of through openings for the discharge of water from said spinner basket, the upper end of said spinner basket sidewall portion terminating in a comparatively short, rounded, inwardly-directed lip portion, a base member, said spinner table being rotatably journalled with respect to said base member, a wash water spray head fixed with respect to said base member at one side thereof and positioned over said spinner basket so as not to interfere with sideward removal of said spinner basket with respect to said spinner table when said spinner basket is supported on said spinner table, and means for connecting said water spray head with a source of water supply under pressure for washing food products in said spinner basket.

2. A food products washing and drying machine as defined in claim 1, wherein said spinner table is provided with a plurality of through openings at is juncture of said upstanding rim.

3. A food products washing and drying machine as defined in claim 1, wherein said spinner table rotating means is a water turbine, said water turbine being actuated by the same source of water supply connected with said water spray head.

4. A food products washing and drying machine as defined in claim 3, including valve means for independently controlling water under pressure being supplied, respectively, to said water spray head and said water turbine.

5. A food products washing and drying machine as defined in claim 3, wherein said water turbine comprises a bucket wheel rotatively journalled in said base member and water jet means directing a stream of water under pressure against the bucket members of said bucket wheel.

* * * * *